United States Patent [19]

Nakamura et al.

[11] Patent Number: 4,545,627
[45] Date of Patent: Oct. 8, 1985

[54] CREEP PREVENTING DEVICE OF AN ANNULAR MEMBER

[75] Inventors: Mitsugu Nakamura, Yokohama; Satoru Yoshizu, Fujisawa; Teiichi Sakata, Yokohama; Hiroyuki Yatabe, Fujisawa, all of Japan

[73] Assignee: Nippon Seiko Kabushiki Kaisha, Japan

[21] Appl. No.: 160,631

[22] Filed: Jun. 18, 1980

[30] Foreign Application Priority Data

Jul. 13, 1979 [JP] Japan .............................. 54-95734[U]

[51] Int. Cl.⁴ ............................................. F16C 33/30
[52] U.S. Cl. .................................................. 384/585
[58] Field of Search ............... 308/15, 22, 189 R, 193, 308/236, 173, DIG. 11; 411/516, 517, 519

[56] References Cited

U.S. PATENT DOCUMENTS

| 1,444,293 | 2/1923 | White | 308/236 |
| 1,662,601 | 3/1928 | Demchuk | 308/236 |
| 2,051,704 | 8/1936 | Harris | 308/236 |
| 2,073,957 | 3/1937 | Brouwer | 308/236 |
| 2,607,642 | 8/1952 | Gilbert | 308/236 |
| 3,669,519 | 6/1972 | Takahashi et al. | 308/236 |
| 3,880,483 | 4/1975 | Snyder, Jr. | 308/236 |

Primary Examiner—Richard R. Stearns
Attorney, Agent, or Firm—Wyatt, Gerber, Shoup, Scobey & Badie

[57] ABSTRACT

A device for preventing creep between an annular member and a partner member holding the annular member includes a resilient ring member fitted within a circumferential groove formed eccentrically in the annular member. The resilient ring member has at least one bulged portion provided with a height extending beyond the circumferential groove, and has a thickness greater than the depth of the circumferential groove.

5 Claims, 5 Drawing Figures

CREEP PREVENTING DEVICE OF AN ANNULAR MEMBER

BACKGROUND OF THE INVENTION

1. Field of the Invention

This invention relates to a creep preventing device for preventing creep between an annular member such as the outer race, inner race, pulley, sleeve or the like of an antifriction bearing and a partner member such as a housing, a shaft or the like holding the annular member between mutually fitted surfaces.

2. Description of the Prior Art

The heretofore known creep preventing devices of annular members are typically of the type utilizing an eccentric groove as shown, for example, in Japanese pat. Publication No. 16404/1963, or of the type which uses a metallic annular ring as shown, for example, in U.S. Pat. No. 3,669,519 granted to Tadanobu Takahashi et al., or of the type which uses a combination of an eccentric groove and a top as shown for example, in Japanese Patent Publication No. 20209/1975) and some of them have already been put into practical use. Such devices, however, have their own merits and demerits in performance, cost, workability, ease of assemblage, etc. and cannot be said to be sufficiently satisfactory.

SUMMARY OF THE INVENTION

It is an object of the present invention to eliminate the above-noted disadvantages and to provide a creep preventing device for an annular member which is relatively simple in construction and easy to assemble and handle, and has a great creep preventing effect. More particularly, the present invention comprises a combination of an eccentric groove formed in an annular member and a specially configured metallic resilient ring member fitted in the eccentric groove.

The invention will hereinafter be described with respect to some embodiments shown in the accompanying drawings in which the invention is applied to the creep preventing device of an antifriction bearing.

DESCRIPTION OF THE PREFERRED EMBODIMENTS

Figure 1:
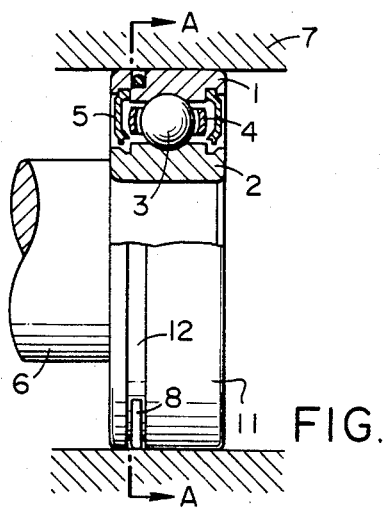
FIG. 1 is a cross-sectional view showing essential portions of an embodiment of the device according to the present invention.

In the drawings, reference numeral 1 designates the outer race of an antifriction bearing, reference numeral 2 denotes an inner race of the antifriction bearing, reference numeral 3 denotes a ball bearing, reference numeral 4 designates a retainer, reference numeral 5 denotes a seal member, reference numeral 6 designates a shaft, reference numeral 7 denotes a housing which serves as the support of the outer race and reference numeral 8 designates a metallic resilient ring member having spring property.

The outer race 1 is an annular member fitted to and held by the housing 7 and is formed in its outer peripheral surface 11 with a circumferential groove 12 eccentric with respect to the outer peripheral surface 11. The circumferential groove may also be of a crescent shape and this may not extend over the entire circumference of the outer peripheral surface 11.

Figure 2:
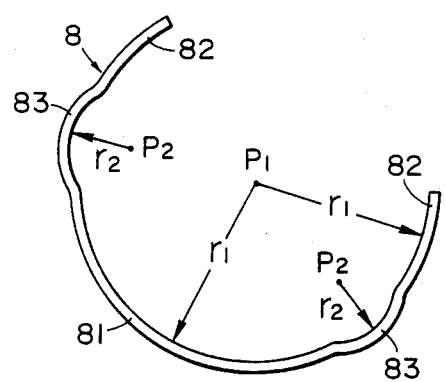
FIG. 2 is a plan view of a resilient ring member used in the device of FIG. 1.

The resilient ring member 8 has a thickness in the radial direction of the bearing that is greater than the depth of the minimum depth portion of the circumferential groove, and the shape of the ring member is preferably as shown in FIG. 2 wherein between arcuate portions 81 and 82 each having a radius $r_1$ centered at a point $P_1$, there are formed arcuate bulged portions 83, 83 each having a radius $r_2$ smaller than the radius $r_1$ of said arcuate portions and centered at a point $P_2$. The height of the bulged portions 83 in the radial direction of the bearing is greater than the maximum depth of the circumferential groove 12.

Figure 3:
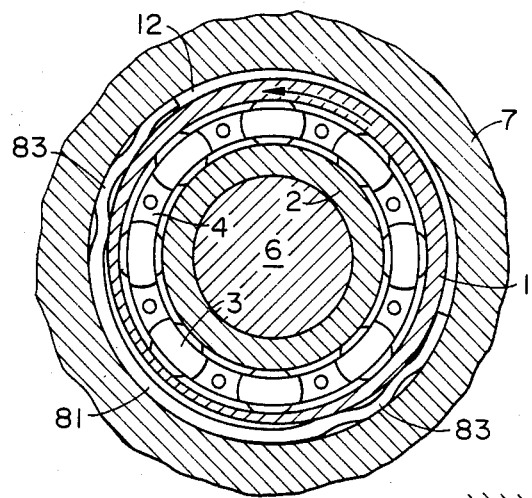
FIG. 3 is a cross-sectional view taken along line A—A of FIG. 1.

The thus formed resilient ring member 8, as shown in FIG. 3, is mounted in resilient contact with the circumferential groove 12 of the outer race in such a manner that each arcuate portion 81 of the resilient ring member lies at a position whereat the depth of groove 12 is greatest, i.e. the left lower portion in FIG. 3, and the ring in member that condition is assembled to the housing 7. In this case, the relation of the circumferential groove 12 to the inner peripheral surface of the housing opposed thereto and the resilient ring member 8 is such that the bulged portions 83, 83 are resiliently pressed and deformed as their central portions are urged against the peripheral surface of the housing and are their opposite end portions are urged against the bottom of the circumferential groove, so that any creep between the mutually fitted surfaces of the outer race 1 and the housing 7 can be prevented also by the resilient force resulting from the compression and deformation of the bulged portions 83 of the resilient ring member 8 itself.

In the device assembled in such condition, the inner race rotates relative to the outer race 1, but for example, when creep in the direction of arrow occurs to the outer race 1 due to a great force having occurred during the rotation of the bearing, one edge of the end portion 82 of the resilient ring member 8 (the right lower end edge thereof in FIG. 3) wedges itself into the minimum gap portion between the bottom portion of the circumferential groove 12 which is small in groove depth and the inner peripheral surface of the housing to thereby prevent occurrence of creep thereafter and also prevents slip between the resilient annular member 8 and the housing 7 by the resilient force resulting from the compression and deformation of the bulged portions 83.

The wedging effect thus acting on one end edge of the resilient ring member 8, combined with the resilient force of the bulged portions 83, provides a creep resistance force and, consequently, preventing of creep can be achieved without increasing the amount of projection of the bulged portions 83 or increasing the diameter of the resilient ring.

Also, the resilient ring member 8 is longer than one half of the circumferential length of the circumferential groove 12 and therefore, the outer race 1 and the resilient ring member 8 are not separable from each other during handling.

In at least one location on that portion of the inner peripheral surface (fitted surface) of the housing which is opposed to the circumferential groove 12 of the outer race 1, there may be formed a recess of any desired shape in which the bulged portion 83 may fit and engage. In this case, as in the above-described case, the arcuate portion 81 of the resilient ring member 8 corresponds to the portion whereat the groove depth is greatest, but the resilient ring member 8 is mounted to the housing 7 without bringing the positions of the bulged portion 83 and recess into accord. In that case, the central portion and the opposite end portions of the bulged portion 83 exhibit the previously described behavior.

When creep in the direction of the arrow of FIG. 3 begins to occur to the outer race 1, the resilient ring member 8, for example, rotates with the outer race 1 and, when a bulged portion 83 comes to a position corresponding to said recess, it jumps out toward the recess and engages the same, and when the creep further progresses, one edge of the end portion 82 of the resilient ring member 8 wedges itself into between the portion of the circumferential groove which is shallow in groove depth and the inner peripheral surface of the housing 7.

Also, there is a case where, depending on the position whereat the bearing having the resilient ring member is assembled to the housing, the resiliency of the bulged portions of the resilient ring member, etc., for example, only the outer race first rotates for said creep to cause said wedging action to take place between the circumferential groove and the housing to thereby prevent the initial creep and when a greater creep force acts, both the outer race and the resilient ring member rotate and when the bulged portion 83 of the resilient ring comes to the position of the recess due to such rotation, the bulged portion jumps out toward the recess and engages the same, whereby preventing the creep thereafter.

Where the assembly has been made with the bulged portion of the resilient ring member brought into accord with the recess from first, a wedging action is caused by the creep of the outer race only, thus providing for the above-described condition.

Figure 4:
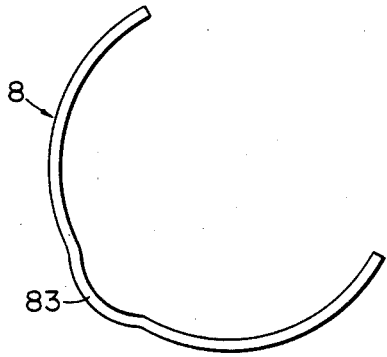
FIG. 4 is a plan view showing another embodiment of the resilient ring member.

FIG. 4 shows another embodiment of the resilient ring member 8 in which a single bulged portion 83 is formed substantially centrally of the circumferential length of the ring.

Figure 5:
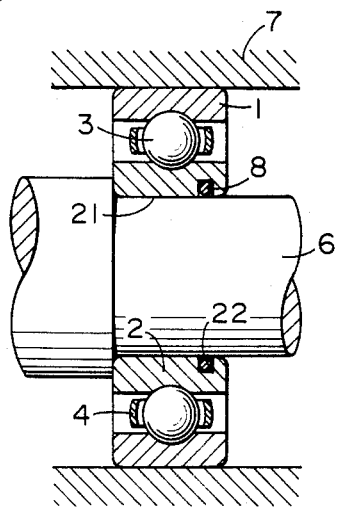
FIG. 5 is a cross-sectional view showing essential portions of another embodiment of the device according to the present invention.

FIG. 5 shows another embodiment of the creep preventing device which is designed to prevent creep between the inner race 2 which is an annular member and the shaft 6. The inner race 2 has in its inner peripheral surface 21 a circumferential groove 22 eccentric with respect to said inner peripheral surface and a resilient ring member 8 is mounted in the space formed between the circumferential groove 22 and the outer peripheral surface of the shaft 6, thus providing the creep preventing device of the present invention. In this case, the bulged portions of the resilient ring member 8 which are compressed and deformed are projectedly formed on the inside diameter side of the ring conversely to those shown in FIGS. 2 to 4.

The embodiments shown and described above are only illustrative of the device of the present invention and for example, the plane shape and cross-sectional shape of the annular members and the resilient ring member and the shape, size, position and number of the bulged portions are not restricted to the shown embodiments but may be suitably changed within the scope of the invention as defined in the appended claims.

According to the creep preventing device of the present invention, as has been described above, even if creep occurs to the annular member, one end edge of the resilient ring wedges itself into the minimum space portion of the eccentric space between the eccentric circumferential groove and the partner portion by the action of the resilient ring having bulged portions to thereby effectively prevent creep, and the resilient ring is held between the annular member and the partner member by the reaction force based on the compression and deformation of the bulged portions to thereby prevent small creep and also prevent the creep between the resilient ring and the partner member. Moreover, this can be achieved without unnecessarily increasing the amount of projection of the bulged portions or increasing the diameter of the resilient ring.

What we claim is:

1. A creep preventing device for preventing creep occurring between an annular member and a partner member fitted to said annular member, said device including:

a circumferential groove formed in the peripheral surface of said annular member eccentrically with respect to said peripheral surface; and a resilient ring member fitted in said circumferential groove and having a circumferential length greater than one half of the circumferential length of said circumferential groove, said ring member having at least one bulged portion extending to a height greater than the maximum depth of said circumferential groove, said resilient ring member having a thickness at its ends greater than the depth of the minimum depth portion of said circumferential groove;

whereby an edge of one end portion of said resilient ring member may wedge itself into the minimum space portion of the eccentric space formed between said circumferential groove and the peripheral surface of the partner member and the central portion of said bulged portion may be urged against the partner member as the opposite ends of the bulged portion are urged against the bottom of said circumferential groove, thereby preventing creep of the annular member.

2. A creep preventing device according to claim 1, wherein said partner member is a housing and said annular member is the outer race of an antifriction bearing supported by said housing.

3. A creep preventing device according to claim 1, wherein said partner member is a rotary shaft and said annular member is the inner race of an antifriction bearing supporting said rotary shaft.

4. A creep preventing device for preventing creep occuring between an annular member and a partner member fitted to said annular member, and device including:

a circumferential groove formed in the peripheral surface of said annular member eccentrically with respect to said peripheral surface; and a resilient ring member fitted in said circumferential groove and having a circumferential length greater than one half of the circumferential length of said circumferential groove, said ring member having at least one bulged portion extending to a height greater than the maximum depth of said circumferential groove, at least the end portions of said resilient ring member having a thickness greater than the depth of the minimum depth portion of said circumferential groove;

whereby an edge of one end portion of said resilient ring member may wedge itself into the minimum space portion of the eccentric space formed between said circumferential groove and the peripheral surface of the partner member and the central portion of said bulged portion may be urged against the partner member as the opposite ends of the bulged portion are urged against the bottom of said circumferential groove, thereby preventing creep of the annular member.

5. A creep preventing device for preventing creep occurring between an annular member and a partner member fitted to said annular member, said device including:
- a circumferential groove formed in the peripheral surface of said annular member eccentrically with respect to said peripheral surface; and
- a resilient ring member fitted in said circumferential groove and having a circumferential length greater than one half of the circumferential length of said circumferential groove, said ring member having at least one bulged portion extending to a height greater than the maximum depth of said circumferential groove, said resilient ring member having a thickness greater than the depth of the minimum depth portion of said circumferential groove;

whereby an edge of one end portion of said resilient ring member may wedge itself into the minimum space portion of the eccentric space formed between said circumferential groove and the peripheral surface of the partner member and the central portion of said bulged portion may be urged against the partner member as the opposite ends of the bulged portion are urged against the bottom of said circumferential groove, thereby preventing creep of the annular member.

* * * * *